(12) United States Patent
Dawson et al.

(10) Patent No.: US 7,599,954 B2
(45) Date of Patent: Oct. 6, 2009

(54) CUSTOMIZING A FILE OPEN DIALOG USING A NAMESPACE EXTENSION TO ALLOW SEARCHING

(75) Inventors: David Dawson, Seattle, WA (US); Steven W. Ickman, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 353 days.

(21) Appl. No.: 11/206,591

(22) Filed: Aug. 18, 2005

(65) Prior Publication Data

US 2007/0043700 A1 Feb. 22, 2007

(51) Int. Cl.
*G06F 17/00* (2006.01)

(52) U.S. Cl. ............... 707/102; 707/1; 707/3; 707/4; 707/5; 707/6; 715/273; 715/762

(58) Field of Classification Search .......... None
See application file for complete search history.

(56) References Cited

U.S. PATENT DOCUMENTS

| | | | | |
|---|---|---|---|---|
| 5,600,778 | A * | 2/1997 | Swanson et al. | 715/762 |
| 5,675,520 | A * | 10/1997 | Pitt et al. | 703/23 |
| 6,212,512 | B1 * | 4/2001 | Barney et al. | 707/1 |
| 6,360,280 | B1 * | 3/2002 | Jones | 719/328 |
| 7,277,912 | B2 * | 10/2007 | Corboy et al. | 709/203 |
| 7,386,535 | B1 * | 6/2008 | Kalucha et al. | 707/2 |
| 2002/0007407 | A1 * | 1/2002 | Klein | 709/225 |
| 2003/0163455 | A1 * | 8/2003 | Dettinger et al. | 707/3 |
| 2003/0182304 | A1 * | 9/2003 | Summerlin et al. | 707/102 |
| 2004/0001106 | A1 | 1/2004 | Deutscher | |
| 2005/0027757 | A1 * | 2/2005 | Kiessig et al. | 707/204 |

* cited by examiner

*Primary Examiner*—Khanh B Pham
*Assistant Examiner*—Andalib F Lodhi
(74) *Attorney, Agent, or Firm*—Shook, Hardy & Bacon, LLP

(57) ABSTRACT

Methods and systems for method for modifying a File Open dialog to enable searching for a file. The method includes writing a namespace extension. Next a custom view is built within the File Open dialog box using the namespace extension. The custom view allows a user input a keyword or phrase within the customized File Open dialog box. Searching then occurs for the file indicated by the user search input using the Desktop Search. The search results are then displayed the within the File Open dialog box.

17 Claims, 8 Drawing Sheets

FIG. 8.
(PRIOR ART)

CUSTOMIZING A FILE OPEN DIALOG USING A NAMESPACE EXTENSION TO ALLOW SEARCHING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Many computer-related applications allow the ability to perform keyword searches for information. Applications such as email programs, word-processing programs, and Internet browsers offer various search capabilities. In relation to browsers, with the wealth of information that may be found on the Internet, various search engines are utilized for keyword searching of the Internet for content specific to the keywords which are inputted into the search engine. A typical search engine generates a set of search results based on the occurrence of the keywords in web pages or meta-tags within web pages.

File Open Dialogs currently contain both browsing capability and search capability. However, both current methods have drawbacks. Current browse capability in a file open dialog is time consuming and difficult for the user. Typical browsing within a file open dialog uses a "browse" metaphor to locate a file to open. A "browse" metaphor scans a hard drive, a database, a list of files, etc. for an item of interest. Several problems exist with the "browse" metaphor. Specifically, the user must understand the hierarchical organization of the data contained on the hard drive. Further, the user must also remember the specific file name associated with the file they wish to retrieve.

A faster way to locate a file to open is through the use of a "search" metaphor. A "search" metaphor allows the user to input a set of keywords that can be matched against all files contained on the hard drive. An example of this type of "search" metaphor is contained in the software ASK JEEVES Desktop Search ("ASK JEEVES"). ASK JEEVES allows a user to search for files and emails on a computer using a keyword or phrase. ASK JEEVES accomplishes this by adding additional windows to a common file open dialog. Essentially, when ASK JEEVES is indexed, an additional window is pasted on top of the common file open dialog. The window includes a "Desktop Search" field and a "Search My Computer" button. A user then types a keyword into the search field. Once a user hits enter or the "Search My Computer" button, ASK JEEVES opens its search application and a second window is displayed along with the results of the search. The results of the search are displayed as files along with their specific full path and file names. From the second window a user is allowed to select a file. Once a file is selected, ASK JEEVES enters the full path name corresponding with the file name into the common file open dialog to open the file.

While ASK JEEVES provides a search function for searching a computer hard drive, it accomplishes the search using multiple windows pasted on the common file open dialog. It further uses the full path name of the file along with the common file open dialog to obtain the file. The multiple windows create a visually confusing search while the need for the common file open dialog causes a limited and slow searching function.

SUMMARY

A method for modifying a file open dialog is provided to allow for search capability. The method uses computer hardware and software to provide search capability in a file open dialog. Specifically, a namespace extension is used to create a custom view that provides search capability in a file open dialog. The custom view may include but is not limited to a search field, a search icon, a search toolbar, a results field, a show toolbar, and a preview pane.

A namespace extension is created that provides a custom view along with searching capability. Creation of the namespace extension is accomplished using an existing Shell. The Shell generally organizes objects into a hierarchical namespace, and provides users and applications with a consistent and efficient way to access and manage objects. The Shell interacts with a Shell namespace to organize the file system and the virtual objects managed by the Shell into a single tree-structured hierarchy. The Shell namespace presents the namespace extension as a folder. When a user browses into this folder, the storable medium is presented as a tree-structured hierarchy of folders and files, much like the rest of the Shell namespace.

A namespace extension consists of 2 basic components: a data manager and an interface between the data manager and a browser. Every folder that the browser displays is represented by a Component Object Model (COM) object called a folder object and each time the user interacts with the folder or its contents, the Shell also communicates with the associated folder object. The folder object then responds to the user's action, and the Shell updates the browser's display.

To build the custom view, a COM interface is implemented. The interface is used to build and manage a custom Shell folder. Specifically, the interface displays or performs an operation on the contents of the Shell's namespace and provides communication between the Shell and the files. The namespace extension allows the data stored in the file to be pulled into the Shell.

Next, a series of interfaces are implemented to present the custom view in the file open dialog. As stated above, the custom view file open dialog includes but is not limited to a search field, a search icon, a search toolbar, a results field, a show toolbar, and a preview pane. The series of interfaces provide a channel of communication between a view object and the file open dialog and allow the file open dialog to communicate with the custom view. The interfaces further allow the Shell view to handle a standard shell extension in a common dialog to communicate with the custom view file open dialog.

BRIEF DESCRIPTION OF THE SEVERAL VIEWS OF THE DRAWINGS

The present invention is described in detail below with reference to the attached drawing figures, wherein:

FIG. 4 is a schematic screen shot showing a view similar;

FIG. 8 is a schematic screen shot showing search results from a prior art desktop search.

DETAILED DESCRIPTION

The present invention will be better understood from the detailed description provided below and from the accompanying drawings of various embodiments of the invention, which describe, for example, methods and systems for modifying a file open dialog to allow for search capability. The detailed description and drawings, however, should not be read to limit the invention to the specific embodiments. Rather, these specifics are provided for explanatory purposes that help the invention to be better understood.

Having briefly described an overview of the present invention in the Summary section above, an exemplary operating environment is described below.

Exemplary Operating Environment

Figure 1:
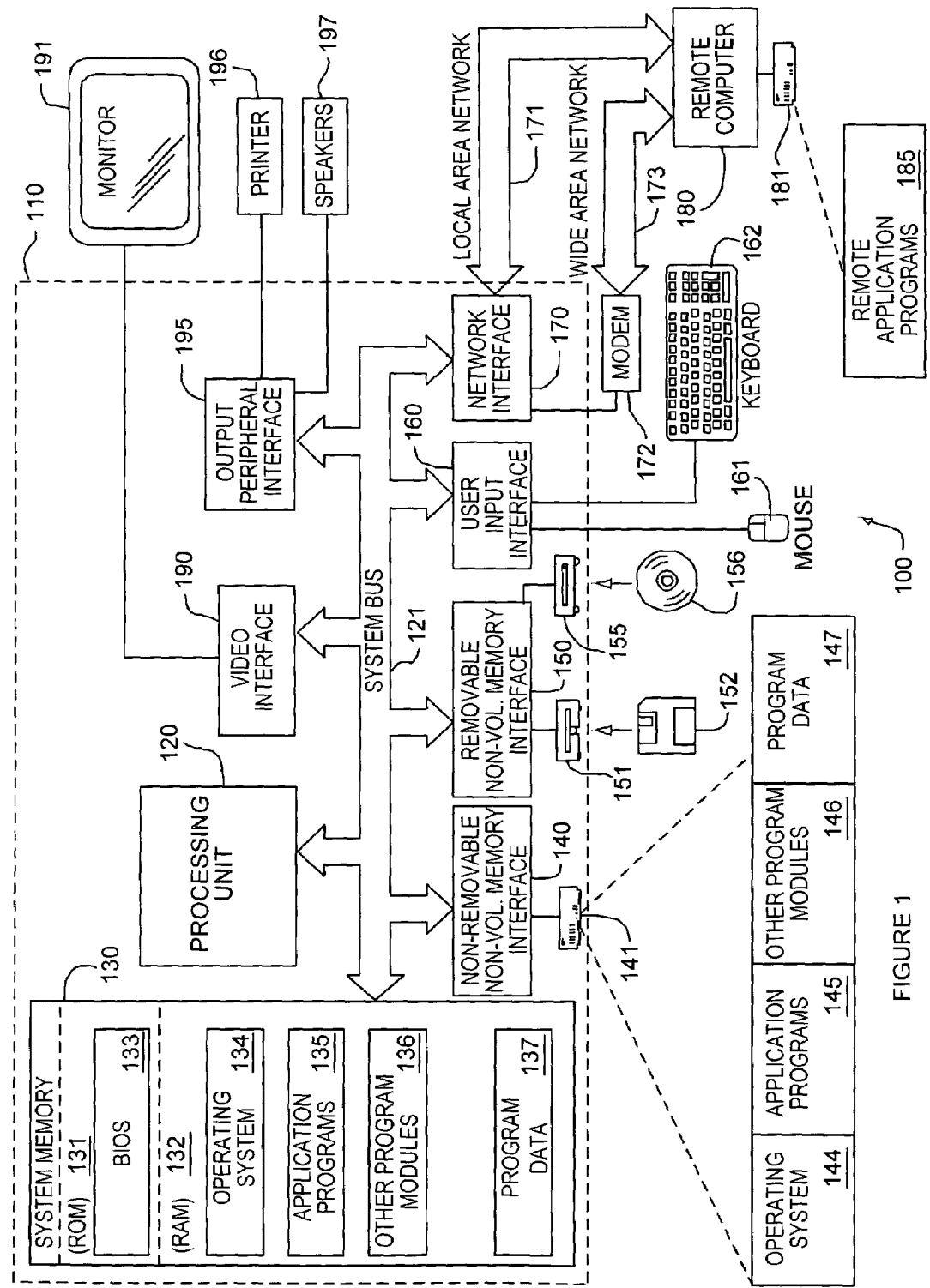
FIG. 1 is a block diagram of a computing system environment suitable for use in implementing the present invention.

Referring to the drawings in general and initially to FIG. 1 in particular, wherein like reference numerals identify like components in the various figures, an exemplary operating environment for implementing the present invention is shown and designated generally as computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the present invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer-readable instructions, data structures, or program modules. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system (BIOS) 133, containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks (DVDs), digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other programs 146 and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the network interface 170, or other appropriate mechanism. In a networked environment, program modules depicted relative to the computer 110, or portions thereof, may be stored in a remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

When the computer 110 is turned on or reset, the BIOS 133, which is stored in the ROM 131, instructs the processing unit 120 to load the operating system, or necessary portion thereof, from the hard disk drive 141 into the RAM 132. Once the copied portion of the operating system, designated as operating system 144, is loaded in RAM 132, the processing unit 120 executes the operating system code and causes the visual elements associated with the user interface of the operating system 134 to be displayed on the monitor 191. Typically, when an application program 145 is opened by a user, the program code and relevant data are read from the hard disk drive 141 and the necessary portions are copied into RAM 132, the copied portion represented herein by reference numeral 135.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between the various steps herein disclosed unless and except when the order of individual steps is explicitly described.

File Open Dialog Searching Using a Namespace Extension

The described method may be implemented using a file open dialog. A namespace extension can be created to modify the file open dialog to provide search capability. Examples of file open dialogs may be found in MICROSOFT WINDOWS or OFFICE applications.

The namespace extensions are used in conjunction with a Shell and a Shell namespace to create a custom view of the file open dialog. The namespace extensions are created to extend the Shell to allow for searching of file hierarchies on a hard drive. Namespace extensions can be created for both physical data and virtual data. Thus, the namespace extensions located on the Shell can provide a single hierarchical representation of both physical data and virtual data.

The namespace extension once created also allows custom Shell views of the data or files in the hierarchies exposed by the Shell. As such, the creation of the namespace extensions provides search capabilities into the Shell.

Figure 2:
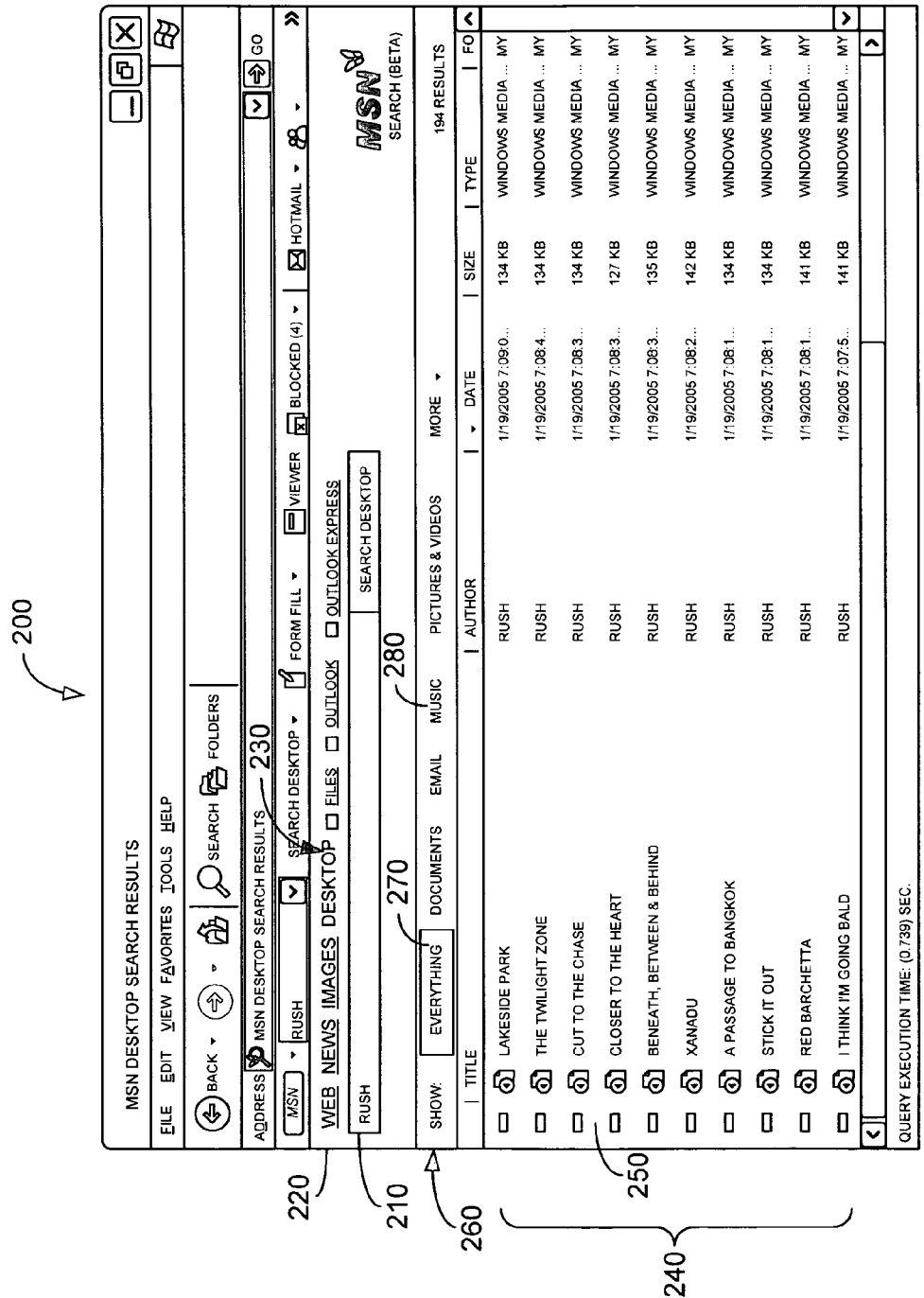
FIG. 2 is a schematic screen shot showing a modified search within a standard shell browser.

FIG. 2 shows an exemplary schematic screen display illustrating a modified MSN Desktop search 200 built into a standard Shell browser. The browser has been extended to support a search. Specifically, FIG. 2 shows search results of a modified MSN Desktop search. In the illustration, several aspects of the modified search are shown in operation. As shown, a Desktop Search field 210 allows the user to input a search term or keyword to be searched. A search toolbar 220 is also shown. The toolbar 220 provides various buttons such as Web, News, Images, Desktop, Files, Outlook, and Outlook Express. These buttons are shown as typical examples and are not intended to be limiting. It should be appreciated by one of ordinary skill in the art that any combination of buttons contemplated for searchable areas on hard drives may be used. These buttons allow the user to select the specific types of locations to search. For example, if a user SELECTS the "Desktop" button 230, only the desktop will be searched. Once a location is selected and a search term has been entered a file list 240 appears in a result field 250.

A "show" toolbar 260 is shown that contains buttons such as Everything, Documents, Email, Music, Pictures and Videos. These buttons allow the user to select which type of files to view from the file list 240. These buttons are shown as typical examples and are not intended to be limiting. It should be appreciated by one of ordinary skill in the art that any combination of buttons contemplated for viewable files may be used. As shown in FIG. 2, the results field 250 contains the file list 240 with "Everything" as evidenced by the highlighted "Everything" button 270 located in the show toolbar 260. However, the user may also restrict the results to be shown in the results field 250. For example, if a user selects a "Music" button 280, only Music files will be displayed in the file list 240 in results field 250.

Figure 3:
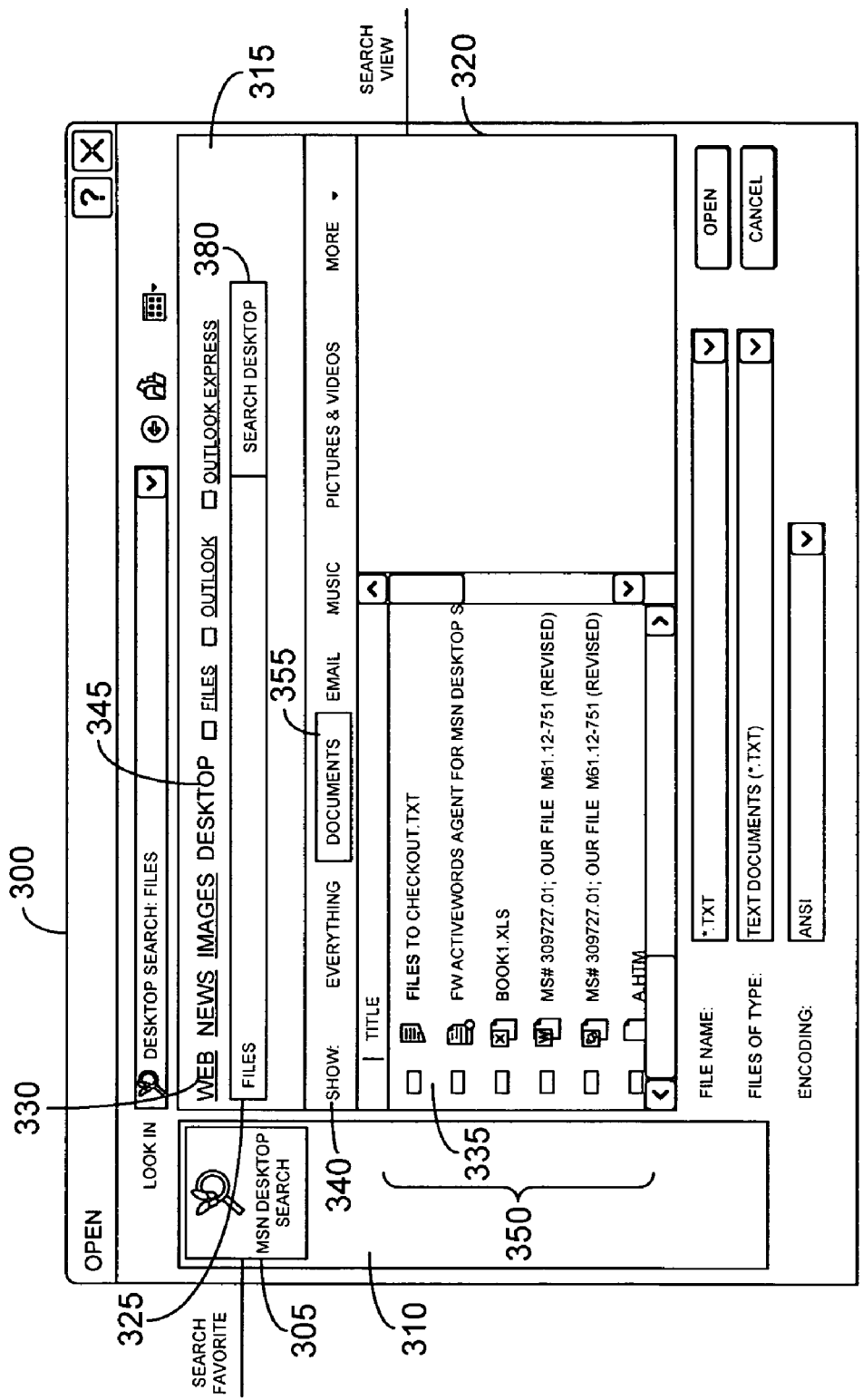
FIG. 3 is a schematic screen shot showing a custom view of a file open dialog.
Figure 4:
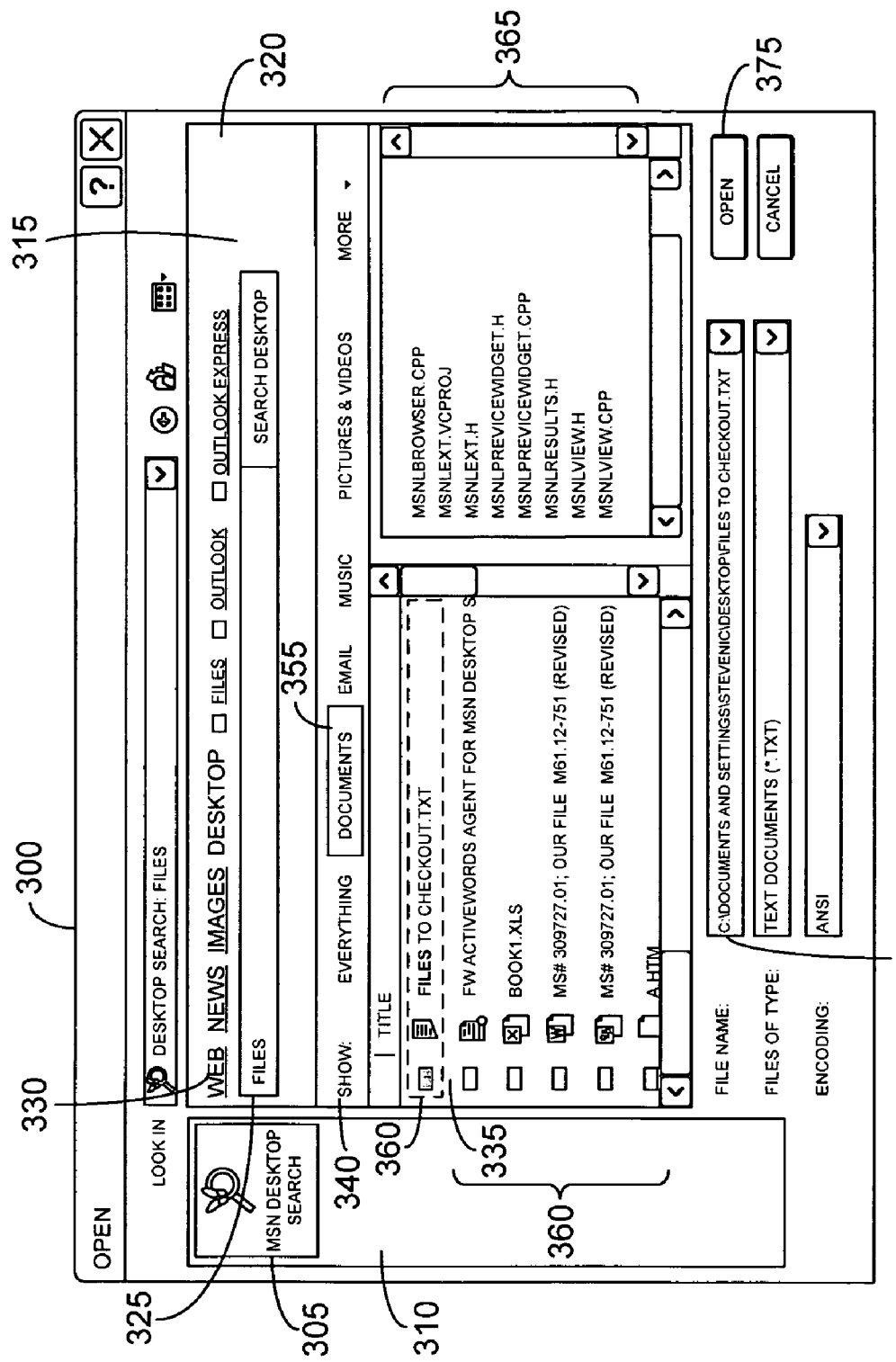

Turning now to FIGS. 3 and 4, an exemplary schematic screen display illustrating a custom view of a file open dialog 300 is shown. The file open dialog 300 has been extended to support a search. Specifically, FIG. 3 shows a file open dialog 300 that has been extended in two ways to add "search" within the file open dialog 300. First a desktop search icon 305 has been added to enable the user to look for files in a pane 310 of the file open dialog 300. Upon selecting the desktop search icon 305, a custom search view 315 appears in a pane 320. The custom search view 315 also contains a search field 325, a search button 380, a search toolbar 330, a results field 335, and a show toolbar 340.

The search field 325 allows the user to input a search term or keyword to be searched. The search toolbar 330 provides various buttons such as Web, News, Images, Desktop, Files, Outlook, and Outlook Express. These buttons are shown as a typical example and are not intended to be limiting. It should be appreciated by one of ordinary skill in the art that any combination of buttons contemplated for searchable areas on hard drives may be used. These buttons allow the user to select the specific types of locations to search. For example, if a user chooses a "Desktop" button 345, only the desktop will be searched. Once a location is selected and a search term has been entered a file list 350 appears in the results field 335.

The "show" toolbar 340 is shown that contains buttons such as Everything, Documents, Email, Music, and Pictures and Videos. These buttons are shown as a typical example and are not intended to be limiting. It should be appreciated by one of ordinary skill in the art that any combination of buttons contemplated for viewable files may be used. These buttons allow the user to select which type of files to view from the search. As shown in FIGS. 3 and 4, the results field 335 contains the file list 350 with "Documents" as evidenced by a highlighted "Documents" button 355 located in the show toolbar 340.

FIG. 4 also shows a selected file 360 in the file list 350 and a preview pane 365 displaying the contents of the selected file 360. Further, once the file 360 is selected its pathname appears in a file name field 370. An open button 375 is also shown and thus, if the user selects the open button 375, the selected file 360 will open in the appropriate application.

Figure 6:
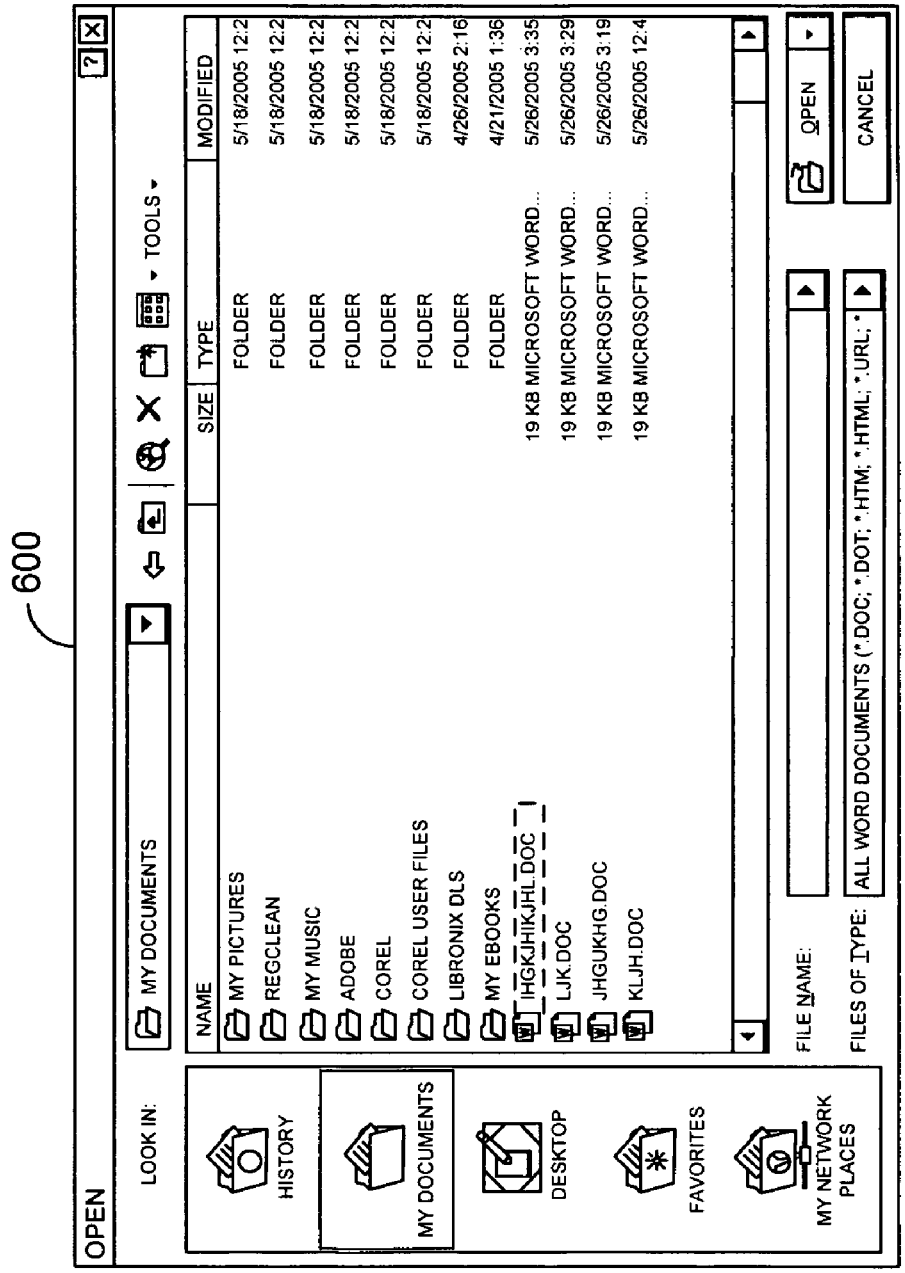
FIG. 6 is a schematic screen shot showing a standard prior art file open dialog.
Figure 7:
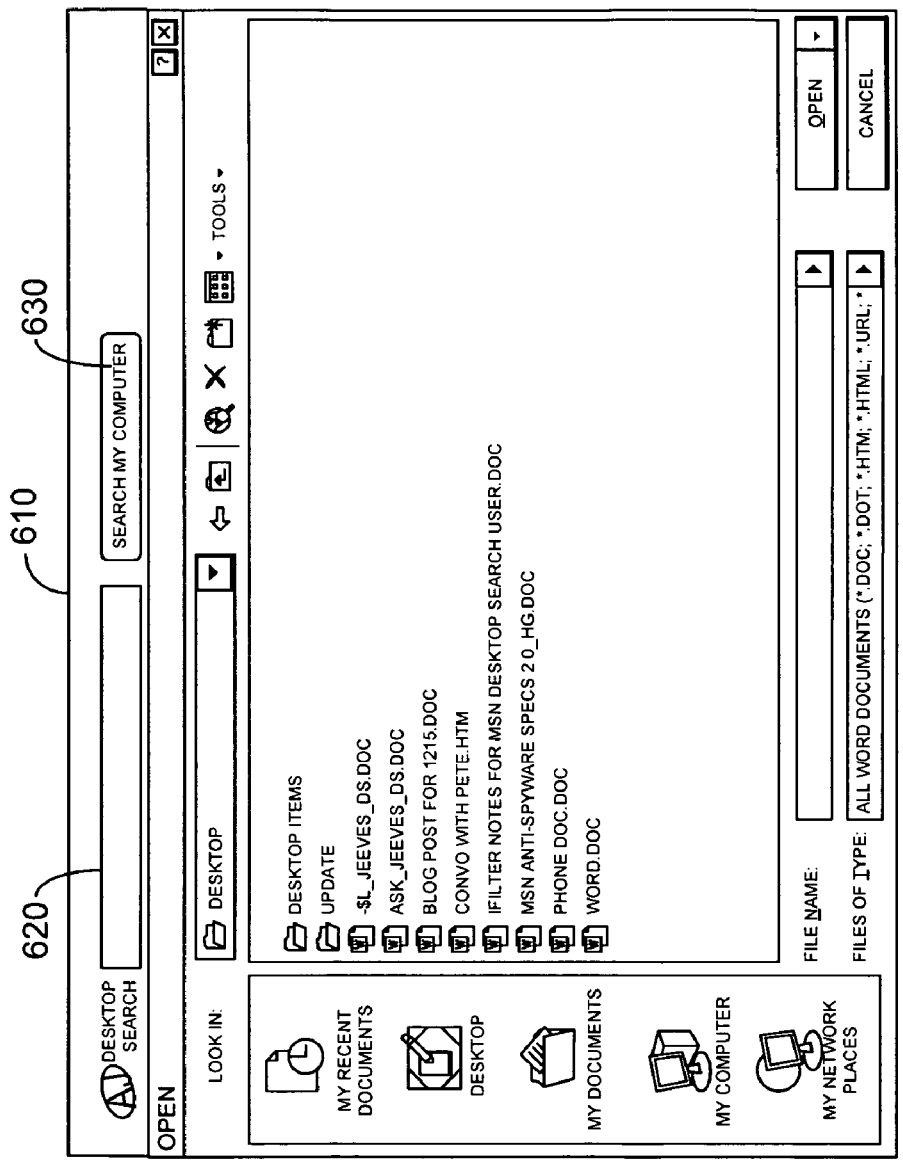
FIG. 7 is a schematic screen shot showing a prior art desktop search.
Figure 8:
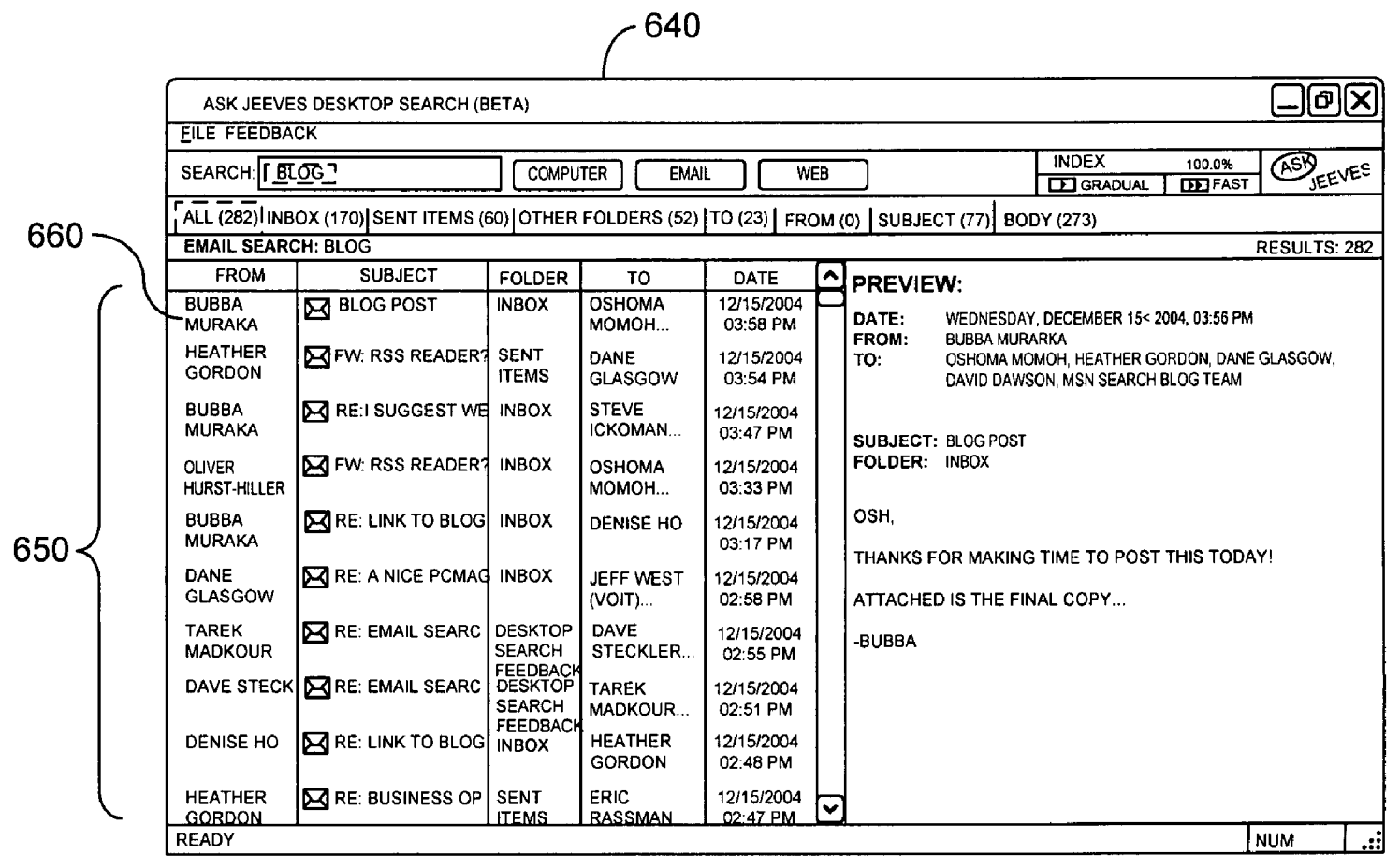

FIGS. 6-8 show a prior art embodiment utilizing a desktop search called ASK JEEVES. ASK JEEVES allows the user to input a set of keywords that can be matched against all files contained on the user's hard drive. ASK JEEVES Desktop Search allows a user to search for files on a computer using a keyword or phrase. FIG. 6 shows a standard file open dialog 600 using a MICROSOFT WINDOWS operating system. ASK JEEVES accomplishes its desktop search by adding additional windows to a common file open dialog. Essentially, when ASK JEEVES is indexed, an additional window 610, shown in FIG. 7, is pasted on top of the common file open dialog 600, as shown in FIG. 6. The window 610 includes a "Desktop Search" field 620 and a "Search My Computer" button 630. A user then types in a keyword into the search field 620. Once a user hits enter or selects the "Search My Computer" button 630, ASK JEEVES opens its search application and a second window 640, shown in FIG. 8, opens that contains a listing 650 of the results of the search. The results 650 of the search are displayed as files along with their specific full path and file names. From the second window 640 a user is allowed to select a file 660. Once the file 660 is selected, ASK JEEVES enters the full path name corresponding with the file name back into the common file open dialog 600 to open the file.

Thus, while ASK JEEVES provides a search function for searching a users hard drive, it accomplishes the search using multiple windows pasted on the common file open dialog. It further uses the full path name of the file along with common file open dialog to obtain the file. The multiple windows create a visually confusing search while the need for the common file open dialog causes a limited and slow searching function.

Returning now to the present invention a discussion of the namespace extension along with the custom file open dialog will be discussed. Creation of the namespace extension is accomplished using an existing Shell. The Shell generally organizes objects into a hierarchical namespace, and provides users and applications with a consistent and efficient way to access and manage objects. Specifically the Shell manages and provides access to the objects that make up a file system. Some examples of these objects are folders and files that reside on a computer hard drive. However, the Shell also manages a number of non-file systems, or virtual objects, as well. Users and applications are able to interact with this virtual folder in much the same way as with any other namespace object.

The shell interacts with a Shell namespace to organize the file system and the virtual objects managed by the Shell into a single tree-structured hierarchy. The Shell namespace presents the namespace extension as a virtual folder. When a user browses into this folder, the storable medium is presented as a tree-structured hierarchy of folders and files, much like the rest of the Shell namespace.

Figure 5:
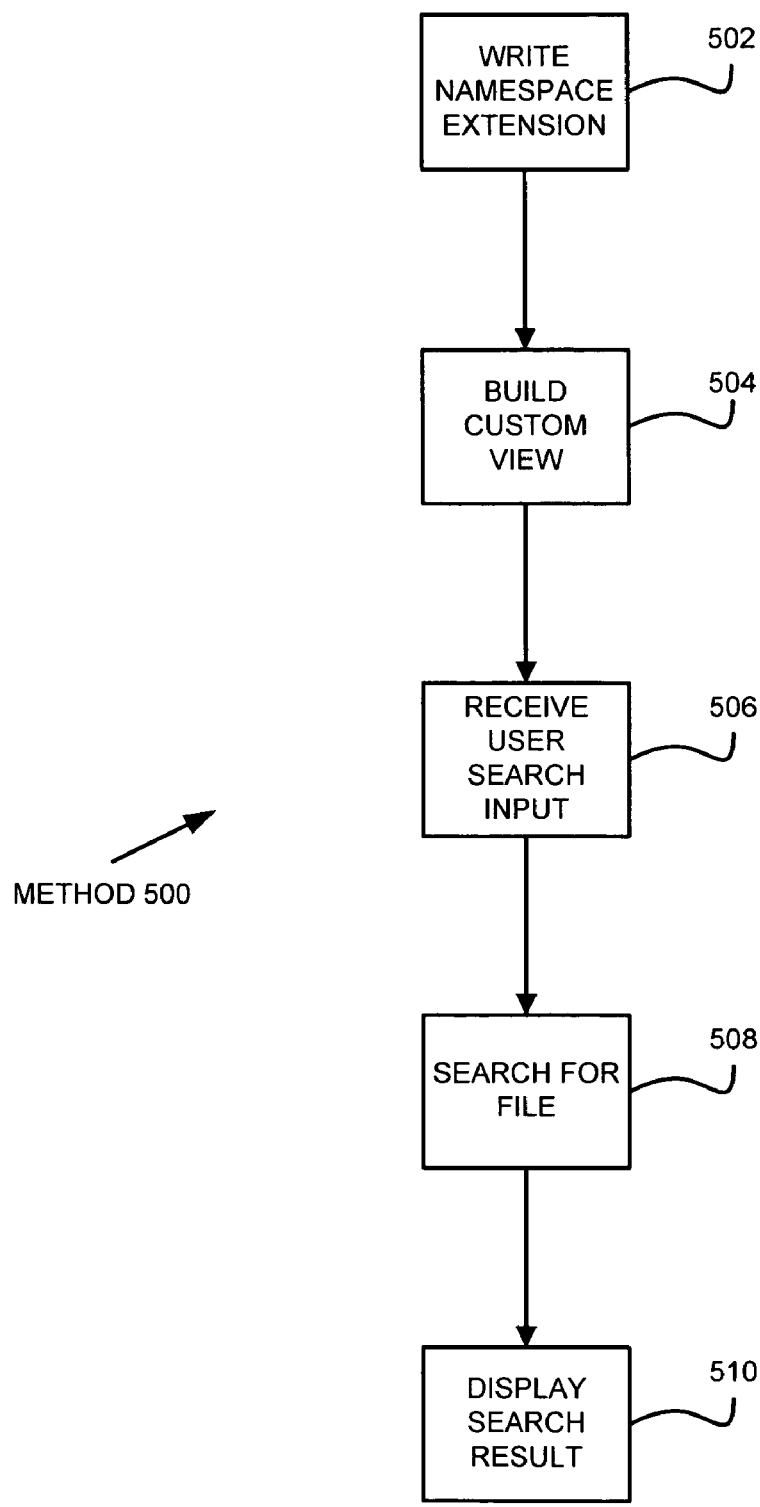
FIG. 5 is a flowchart illustrating an exemplary process for an embodiment of the present invention.

Turning now to FIG. 5 there is illustrated one embodiment of a method 500 for modifying a file open dialog to provide enhanced search capability. As shown at 502 a namespace extension must be written. A namespace extension consists of two major components: a data manager and an interface between the data manager and a Shell browser. The namespace extension allows a user to take any storable medium on a computer system and have the Shell browser present it to the user as a folder. An example of such a Shell browser is WINDOWS EXPLORER. To implement a namespace extension, the storable medium must be organized as a tree-structured namespace. The namespace extension is presented as a virtual folder in the Shell namespace. The Shell namespace organizes the file system and other objects managed by the Shell into a single tree-structured hierarchy. When a user browses into this folder, the storable medium is presented as the tree-structured hierarchy of folders and files, much like the rest of the Shell namespace.

The namespace extension is created by first building a Component Object Model (COM) Dynamic-Link Library (dll). A COM is used to add functionality to the namespace extension. The COM.dll allows executable routines to be stored separately as a file with a dll extension that is loaded only when necessary. Every folder that the browser displays is represented by a COM object called a folder object. Each time the user interacts with the folder or its contents, the Shell communicates with the associated folder object through one of a number of standard interfaces. The folder object then responds to the user's action, and the Shell updates the Shell browser's display.

Next, as shown at 504 a custom view is built. An example of a custom view of a file open dialog 300 is shown in FIGS. 3 and 4. To build a custom view, a COM interface is implemented. The interface is used to build and manage a custom Shell folder. Specifically, the interface displays or performs an operation on the contents of the Shell namespace. More specifically, the interface is used for objects that extend the Shell namespace. For example, this interface may be used to create a separate namespace that requires a rooted Windows Explorer or to install a new namespace directly within the hierarchy of the Shell namespace. The interface also provides communication between the Shell and the files. The namespace extension allows the data stored in the file to be pulled into the Shell. An example of the COM interface is Microsoft's IshellFolder.

Next, a second interface is implemented to present the custom view in the file open dialog. As shown in FIGS. 3 and 4, the custom view may include the search field 325, the search toolbar 330, the results field 335, the show toolbar 340, the file list 350, and the preview pane 365. It should be understood that the above items shown in the custom view are not meant to be limiting. The second interface provides a channel of communication between a view object and the file open dialog. This second interface is implemented by the namespace extensions that display themselves in the file open dialog. An example of this type of interface is Microsoft's IshellView.

Next, a third interface is implemented to allow the file open dialog to communicate with the custom view. The third interface allows the Shell view to handle a standard shell extension in a common dialog to communicate with the custom view file open dialog. An example of this type of interface is Microsoft's IcommDlgBrowser. Next, a fourth interface is implemented to extend the capabilities of the third interface. The fourth interface is used by the file open dialog when it hosts a Shell browser. An example of this type of interface is Microsoft's IcoImDlgBrowser2.

Next, as shown in 506 a user's search input is received and at 508 the file open dialog searches for the file. Referring again to FIGS. 3 and 4, searching may occur by typing a keyword into the search field 325 and selecting the search button 380. Once the search button 380 is pressed the search occurs at 508 and results are displayed at 510. As seen in FIGS. 3 and 4, the search results are shown in the results field 350 as a file list 335.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method for modifying a File Open dialog to enable searching for a file, comprising:
   writing a namespace extension to organize a file system into a tree-structured hierarchy of files and folders;
   building a customized shell view within a File Open dialog box based on the namespace extension by implementing a Component Object Model (COM) interface to display or perform an operation on contents of said customized shell via a user input device;
   providing a channel of communication between a view object and said File Open dialog via a second COM interface;
   providing a channel of communication between said File Open dialog and said customized shell view via a third COM interface;
   hosting a Shell browser via a fourth COM interface;
   receiving a user search input within the customized File Open dialog box;
   searching for a file indicated by the user search input; and
   displaying at least one search result within the customized File Open dialog box via a user output device.

2. The method of claim 1, wherein said COM comprises a Dynamic Link Library (dll).

3. The method of claim 1, further comprising:
   displaying an icon for Desktop Search in the customized File Open dialog box.

4. The method of claim 1, further comprising:
   enabling a user to drag and drop the at least one search result from the customized File Open dialog box.

5. The method of claim 1, further comprising:
   narrowing the at least one search result while the user search input is being received within the File Open dialog box,
   wherein the displaying is performed while the user search input is being received.

6. The method of claim 1, further comprising displaying a preview pane containing contents of a user specified file from said at least one search result.

7. The method of claim 6, further comprising displaying a filename pane containing a pathname of said user specified file.

8. The method of claim 7, wherein all of said writing, said building, said receiving, said searching, said displaying at least one search result, said displaying a preview pane, and said displaying a filename pane are all executed from a singular customized File Open dialog box.

9. A customized File Open dialog system, comprising:
   a general purpose computing system which includes computer storage media and communication media;
   a system memory component;
   a search engine that is operative to generate a list of search results from a user search input, wherein said list of search results are obtained from searching one of said system memory component and an interconnected computer network;
   a browser which is capable of scanning contents of said system memory component and said interconnected computer network;
   a component for building a customized shell view within a File Open dialog box based on the namespace extension by implementing a Component Object Model (COM) interface to display or perform an operation on contents of said customized shell via a user input device;
   a second COM interface which is operative to provide a channel of communication between a view object and said File Open dialog;
   a third COM interface which is operative to provide a channel of communication between said File Open dialog and said customized shell view; and
   a fourth COM interface which is operative to host a Shell browser;
   a search location toolbar designator;
   show toolbar designator that is operative to select a type of file from said list of search results;
   a preview pane that is operative to display contents of a user specified file from said list of search results;
   a filename pane that is operative to display a pathname of said user specified file; and an open toolbar designator that is operative to display said user specified file contents within its appropriate application.

10. The system of claim 9, wherein all of said search location toolbar designator, said show toolbar designator, said preview pane, said filename pane, and said open toolbar designator are all displayed and executed from a singular customized File Open dialog box.

11. The system of claim 9, further comprising:
an icon for Desktop Search.

12. The system of claim 9, wherein said list of search results is narrowed and displayed while the user search input is being received within the customized File Open dialog system.

13. One or more computer-readable storage media having computer-executable instructions embodied thereon that, when executed, cause a computing device to perform a method of modifying a File Open dialog to enable searching for a file, the method comprising:

writing a namespace extension to organize a file system into a tree-structured hierarchy of files and folders;

building a customized shell view within a File Open dialog box based on the namespace extension by implementing a Component Object Model (COM) interface to display or perform an operation on contents of said customized shell via a user input device;

providing a channel of communication between a view object and said File Open dialog via a second COM interface;

providing a channel of communication between said File Open dialog and said customized shell view via a third COM interface;

hosting a Shell browser via a fourth COM interface;

receiving a user search input within the customized File Open dialog box;

searching for a file indicated by the user search input; and displaying at least one search result within the customized File Open dialog box.

14. The computer readable storage medium of claim 13, wherein said COM comprises a Dynamic Link Library (dll).

15. The computer readable storage medium of claim 13, further comprising displaying a preview pane containing contents of a user specified file from said at least one search result.

16. The computer readable storage medium of claim 15, further comprising displaying a filename pane containing a pathname of said user specified file.

17. The computer readable storage medium of claim 16, wherein all of said writing, said building, said receiving, said searching, said displaying at least one search result, said displaying a preview pane, and said displaying a filename pane are all executed from a singular customized File Open dialog box.

\* \* \* \* \*

UNITED STATES PATENT AND TRADEMARK OFFICE
CERTIFICATE OF CORRECTION

| | | |
|---|---|---|
| PATENT NO. | : 7,599,954 B2 | Page 1 of 1 |
| APPLICATION NO. | : 11/206591 | |
| DATED | : October 6, 2009 | |
| INVENTOR(S) | : Dawson et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 391 days.

Signed and Sealed this

Twenty-eighth Day of September, 2010

David J. Kappos
*Director of the United States Patent and Trademark Office*

UNITED STATES PATENT AND TRADEMARK OFFICE
CERTIFICATE OF CORRECTION

PATENT NO. : 7,599,954 B2  
APPLICATION NO. : 11/206591  
DATED : October 6, 2009  
INVENTOR(S) : David Dawson et al.

Page 1 of 1

It is certified that error appears in the above-identified patent and that said Letters Patent is hereby corrected as shown below:

In column 10, line 52, in Claim 9, before "show" insert -- a --.

Signed and Sealed this
Eighth Day of February, 2011

David J. Kappos
*Director of the United States Patent and Trademark Office*